United States Patent
Shahriari et al.

(10) Patent No.: US 12,221,177 B2
(45) Date of Patent: Feb. 11, 2025

(54) DEBOOST METHODS AND SYSTEMS FOR ACTIVE SAFETY STEERING CONTROL

(71) Applicant: GM GLOBAL TECHNOLOGY OPERATIONS LLC, Detroit, MI (US)

(72) Inventors: Mohammadali Shahriari, Markham (CA); Tushita Arun Sikder, Windsor (CA); Reza Zarringhalam, Whitby (CA); Ashraf Abualfellat, Grand Blanc, MI (US); Emily Frances Wolfangel, West Bloomfield, MI (US); Brian Porto, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 18/065,902

(22) Filed: Dec. 14, 2022

(65) Prior Publication Data
US 2024/0199111 A1    Jun. 20, 2024

(51) Int. Cl.
*B62D 5/04* (2006.01)
*B62D 6/00* (2006.01)

(52) U.S. Cl.
CPC ......... *B62D 5/0481* (2013.01); *B62D 5/0463* (2013.01); *B62D 6/00* (2013.01)

(58) Field of Classification Search
CPC ..... B62D 5/0481; B62D 6/002; B62D 15/025
See application file for complete search history.

(56) References Cited

U.S. PATENT DOCUMENTS

| | | | |
|---|---|---|---|
| 2007/0043490 A1* | 2/2007 | Yokota | B62D 5/0463 701/41 |
| 2010/0138109 A1* | 6/2010 | Wang | B62D 5/0472 701/99 |
| 2011/0010054 A1* | 1/2011 | Wilson-Jones | B62D 6/008 701/41 |
| 2015/0251694 A1* | 9/2015 | Wagner | B62D 5/0481 701/41 |
| 2016/0251027 A1* | 9/2016 | Farrelly | B62D 5/0463 701/41 |
| 2017/0158230 A1* | 6/2017 | McLaughlin | B62D 6/00 |
| 2020/0031387 A1* | 1/2020 | Gagné | B62D 5/0472 |
| 2020/0247461 A1* | 8/2020 | Farrelly | B62D 15/0215 |
| 2021/0253158 A1* | 8/2021 | Hulten et al. | B62D 5/008 |

FOREIGN PATENT DOCUMENTS

| | | |
|---|---|---|
| DE | 102021111140 A1 | 4/2022 |
| DE | 102021114768 A1 | 6/2022 |

* cited by examiner

*Primary Examiner* — Long T Tran
(74) *Attorney, Agent, or Firm* — Lorenz & Kopf LLP

(57) ABSTRACT

Methods and systems are provided for controlling a vehicle comprising an Electric Power Steering System (EPS). In an embodiment, a method includes learning, by a processor, a non-linearity of a boost factor associated with the EPS; determining, by the processor, a deboost factor based on an inverse relationship of the learned non-linearity of the boost factor associated with the EPS; and generating, by the processor, a steering command to the EPS based on the deboost factor.

20 Claims, 3 Drawing Sheets

DEBOOST METHODS AND SYSTEMS FOR ACTIVE SAFETY STEERING CONTROL

INTRODUCTION

The present disclosure generally relates to automated lateral control of a vehicle and associated methods and systems.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from systems such as global positioning systems (GPS) to navigate. However, it may be desirable to improve control of an autonomous vehicle, for example in controlling steering of an autonomous vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, lane keeping control, lane centering control and parking assistance systems correspond to lower automation levels, while true "driverless" vehicles correspond to higher automation levels. Various automated driver assistance systems of different automation levels rely on effective lateral control of the vehicle through a steering system.

An electric power steering system (EPS) provides steering assistance through a motor based on a requested torque. The response of the EPS system to the requested torque has different levels of nonlinearities due to a boost function associated with the EPS. For example, the boost function may be tuned differently for different vehicles/steering systems to deliver a required performance and/or steering feel. Therefore, to provide a desirable automated controls performance across different operation ranges, the control logic has to be manually retuned to for any changes to the EPS including the corresponding control software.

Accordingly, it is desirable to provide improved methods and systems for providing automated controls performance across different steering systems and/or operating ranges through an improved torque request. Furthermore, other desirable features and characteristics of the present invention will be apparent from the subsequent detailed description and the appended claims, taken in conjunction with the accompanying drawings and the foregoing technical field and background.

SUMMARY

Methods and systems are provided for controlling a vehicle comprising an Electric Power Steering System (EPS). In an embodiment, a method includes: learning, by a processor, a non-linearity of a boost factor associated with the EPS; determining, by the processor, a deboost factor based on an inverse relationship of the learned non-linearity of the boost factor associated with the EPS; and generating, by the processor, a steering command to the EPS based on the deboost factor.

In various embodiments, the learning includes learning the non-linearity based on a measured lateral acceleration of the vehicle and a target lateral acceleration of the vehicle.

In various embodiments, the learning includes learning the non-linearity based on a vehicle velocity.

In various embodiments, the learning includes learning the non-linearity based on:

$$P_{bi+1} = P_{bi} + \frac{g_{p,i}}{\tau_c * K_{bi}} (a_{y,m} - P_{bi} * \tau_c * K_{bi}),$$

where $P_{bi}$ represents an initial boost factor, Tc represents a commanded torque, $a_{y,m}$ represents the measured lateral acceleration, $g_{p,i}$ represents a gain factor, and $K_{bi}$ represents an initial deboost factor.

In various embodiments, the determining the deboost factor is based on an adaptive filter.

In various embodiments, the determining includes determining the deboost factor based on:

$$K_{bi+1} = K_{bi} + \frac{g_{k,i}}{P_{bi}} \left( \frac{a_{y,t}}{\tau_c} - \frac{a_{y,m}}{\tau_c} \right),$$

where $P_{bi}$ represents an initial boost factor, Tc represents the commanded torque, $a_{y,m}$ represents the measured lateral acceleration, $g_{k,i}$ represents a gain factor, and $K_{bi}$ represents an initial deboost factor. The vehicle control system of claim 1, wherein the steering command is an adjusted torque command.

In various embodiments, the steering command is the adjusted torque command for a vehicle velocity.

In various embodiments, the method includes storing the learned non-linearities as a model in a data storage device based on a vehicle velocity.

In another embodiment, a vehicle control system includes: a non-transitory computer readable medium comprising program instructions; and at least one processor in operable communication with the non-transitory computer readable medium, the at least one processor configured to execute the program instructions. The program instructions are configured to cause the at least one processor to: learn a non-linearity of a boost factor associated with the EPS; determine a deboost factor based on an inverse relationship of the learned non-linearity of the boost factor associated with the EPS; and generate a steering command to the EPS based on the deboost factor.

In various embodiments, the program instructions are configured to cause the at least one processor to learn the non-linearity based on a measured lateral acceleration of the vehicle and a target later acceleration of the vehicle.

In various embodiments, the program instructions are further configured to cause the at least one processor to learn the non-linearity based on a vehicle velocity.

In various embodiments, the program instructions are configured to cause the at least one processor to learn the non-linearity based on:

$$P_{bi+1} = P_{bi} + \frac{g_{p,i}}{\tau_c * K_{bi}} (a_{y,m} - P_{bi} * \tau_c * K_{bi}),$$

where $P_{bi}$ represents an initial boost factor, $\tau_c$ represents a commanded torque, $a_{y,m}$ represents the measured lateral acceleration, $g_{p,i}$ represents a gain factor, and $K_{bi}$ represents an initial deboost factor.

In various embodiments, the program instructions are configured to cause the at least one processor to determine the deboost factor based on an adaptive filter.

In various embodiments, the program instructions are configured to cause the at least one processor to determine the deboost factor based on:

$$K_{bi+1} = K_{bi} + \frac{g_{k,i}}{P_{bi}}\left(\frac{a_{y,t}}{\tau_c} - \frac{a_{y,m}}{\tau_c}\right),$$

where $P_{bi}$ represents an initial boost factor, $\tau_c$ represents the commanded torque, $a_{y,m}$ represents the measured lateral acceleration, $g_{k,i}$ represents a gain factor, and $K_{bi}$ represents an initial deboost factor.

In various embodiments, the steering command is an adjusted torque command.

In various embodiments, the steering command is the adjusted torque command for a vehicle velocity.

In various embodiments, the program instructions are configured to store the learned non-linearities as a model in a data storage device based on a vehicle velocity.

In another embodiment, a vehicle includes: an Electric Power Steering System (EPS); a sensor system configured to sense observable conditions of the EPS and generate sensor data; and at least one processor in operable communication with the EPS and the sensor system, the at least one processor configured to execute program instructions. The program instructions are configured to cause the at least one processor to: learn a non-linearity of a boost factor associated with the EPS based on the sensor data; determine a deboost factor based on an inverse relationship of the learned non-linearity of the boost factor associated with the EPS; and generate a steering command to the EPS based on the deboost factor.

In various embodiments, the program instructions are configured to cause the at least one processor to learn the non-linearity based on:

$$P_{bi+1} = P_{bi} + \frac{g_{p,i}}{\tau_c * K_{bi}}(a_{y,m} - P_{bi} * \tau_c * K_{bi}),$$

where $P_{bi}$ represents an initial boost factor, $\tau_c$ represents a commanded torque, $a_{y,m}$ represents the measured lateral acceleration, $g_{p,i}$ represents a gain factor, and $K_{bi}$ represents an initial deboost factor, and the program instructions are configured to cause the at least one processor to determine the deboost factor based on:

$$K_{bi+1} = K_{bi} + \frac{g_{k,i}}{P_{bi}}\left(\frac{a_{y,t}}{\tau_c} - \frac{a_{y,m}}{\tau_c}\right),$$

where $P_{bi}$ represents an initial boost factor, $\tau_c$ represents the commanded torque, $a_{y,m}$ represents the measured lateral acceleration, $g_{k,i}$ represents a gain factor, and $K_{bi}$ represents the initial deboost factor.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
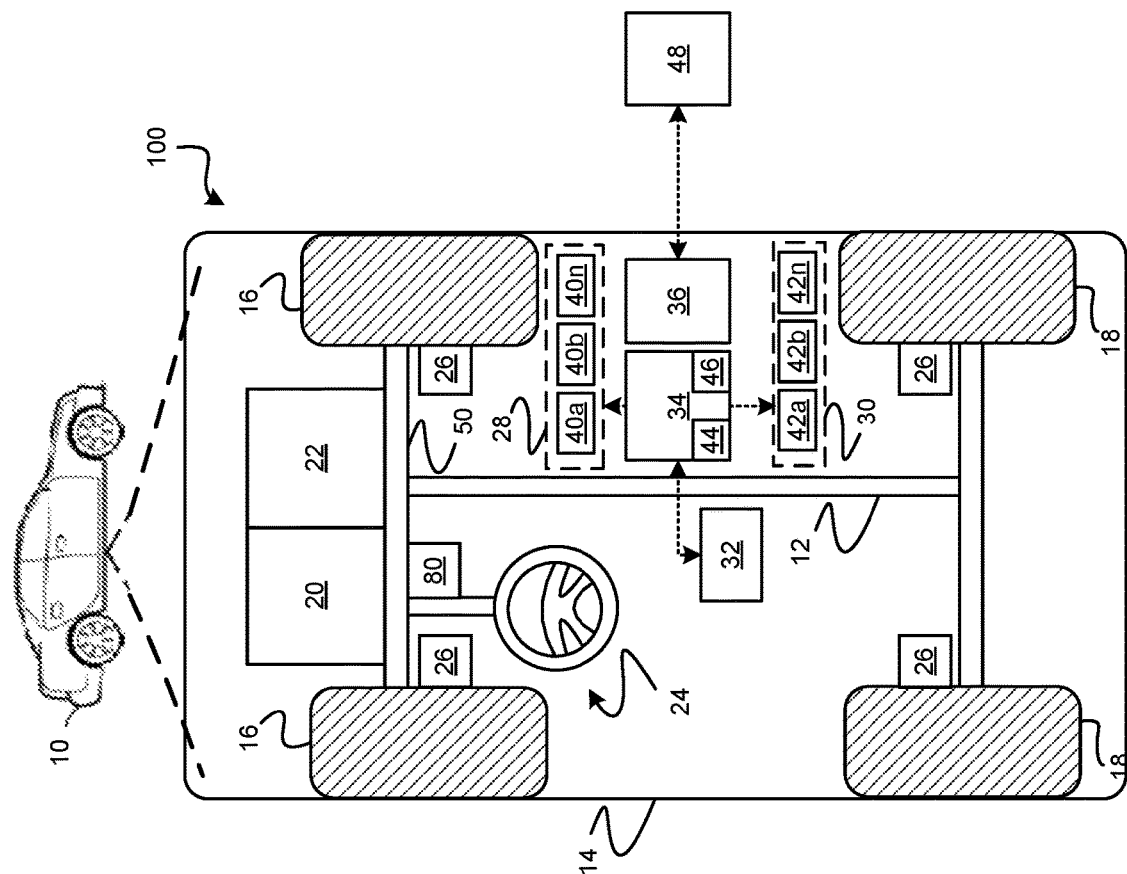
FIG. 1 is a functional block diagram illustrating a vehicle having a lateral vehicle control system, in accordance with various embodiments.

With reference to FIG. 1, a lateral vehicle control system shown generally at 100 is associated with a vehicle 10 in accordance with various embodiments. In general, the lateral vehicle control system 100 explicitly models the nonlinearities of a steering system and adapts a steering command used in automated controls to autonomously control the vehicle. In various embodiments, the nonlinearities of the steering system are identified in real-time, and automatically adapts the steering command to ensure a linear vehicle-level acceleration response to the steering command, regardless of the vehicle type or steering system type.

As depicted in FIG. 1, the vehicle 10 generally includes a chassis 12, a body 14, front wheels 16, and rear wheels 18. The vehicle 10 is depicted in the illustrated embodiment as a passenger car, but it should be appreciated that the lateral vehicle control system 100 may be included within any other vehicle including trucks, sport utility vehicles (SUVs), recreational vehicles (RVs), etc., can also be used.

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The steering system 24 includes an electric power steering (EPS) system 80 that includes an electric steering motor. The electric steering motor provides electric steering assist in response to a vehicle driver turning the steering wheel and/or the autonomous control system determining a lateral control signal. In other words, the EPS system 80 is configured to turn the wheels 16 the amount commanded by the driver/control system so that the turning of the wheels 16 on the roadway is easier. As is understood by one of ordinary skill in the art, the EPS system 80 electrically assists a driver in the steering of the vehicle 10 by applying a motor torque command to the steering motor during an EPS-assisted steering maneuver. As can be appreciated, such assisted steering maneuvers associated with an autonomous or semi-autonomous system can include, but are not limited to, collision avoidance steering, lane keeping assist steering, and other ADAS features.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. In various embodiments, the sensing devices 40a-40n include an HWA (Hand Wheel Angle or Road Wheel Angle) sensor, a steering torque sensor, and/or one or more vehicle dynamics sensors. The HWA sensor provides a measure of the angle of the steering wheel. For example, the HWA sensor may be a steering angle sensor mounted to a steering column that measures the rotation of the steering wheel and the steering column and provides a steering angle signal indicative of same. A driver applied torque sensor may be mounted to the steering column that measures the torque on the steering column and provides a torque signal indicative of same. Alternately, instead of using a steering angle sensor to provide the steering angle, a pinion angle (PA) sensor can be employed to provide the steering angle, which gives a more direct measurement of road wheel angle, as is well understood by those skilled in the art.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42a-42n that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the lateral vehicle control system 100 and, when executed by the processor 44, implement the lateral vehicle control system 100 and methods described with respect to FIGS. 2 and 3. In particular, the instructions of the controller 34 identify and model the nonlinearities of a steering system in real-time based on data received from the sensor system 28 and adapts a steering command used to control the steering of the vehicle 10.

Figure 2:
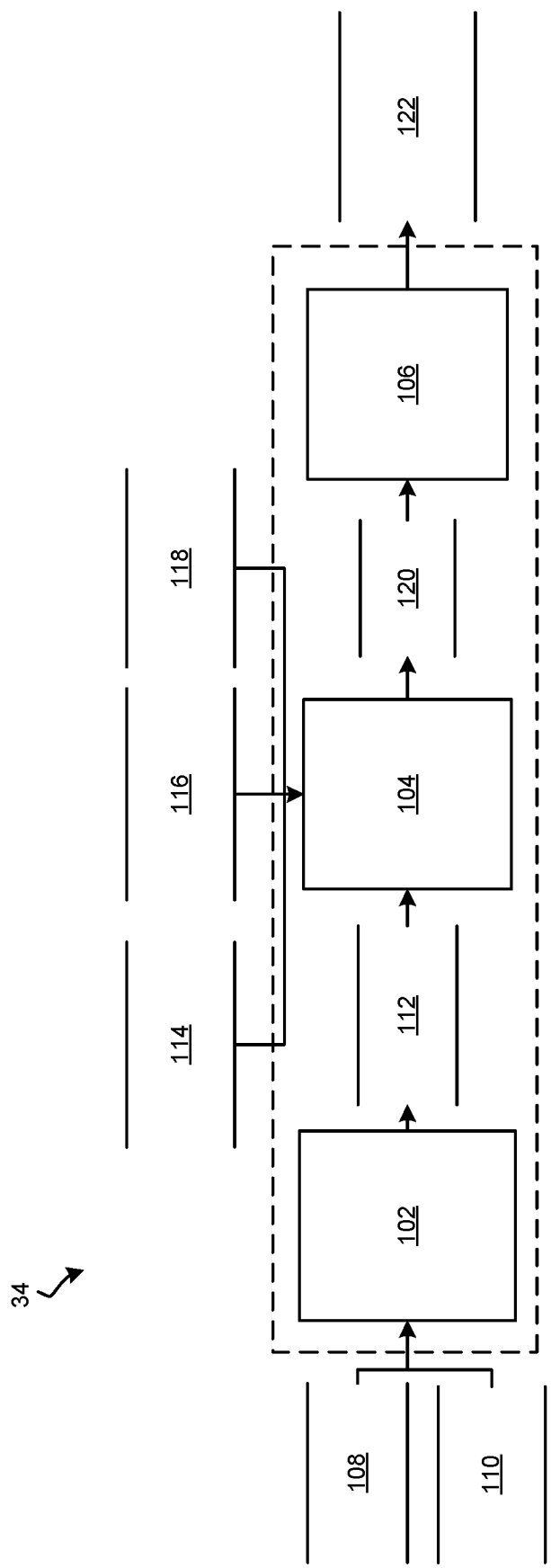
FIG. 2 is a diagram of a lateral vehicle control system, in accordance with various embodiments.

Referring now to FIG. 2 and with continued reference to FIG. 1, a dataflow diagram illustrates various embodiments of lateral vehicle control system 100 which may be embedded within the controller 34 of FIG. 1 in accordance with various embodiments. Inputs to lateral vehicle control system 100 may be received from the sensor system 28, received from other control modules (not shown) associated with the vehicle 10, received from the communication system 36, and/or determined/modeled by other sub-modules (not shown) within the controller 34. As can be appreciated, the sub-modules shown in FIG. 2 may be combined and/or further partitioned to similarly generate control signals for controlling steering of the vehicle 10. Inputs to the controller 34 may be received from the sensor system 28, received from other control modules (not shown) of the vehicle 10, and/or determined by other sub-modules (not shown) of the controller 34. In various embodiments, the controller 34 includes a steering command determination module 102, a deboost determination module 104, and an adjusted steering command determination module 106.

The steering command determination module 102 receives as input steering sensor data 108, and/or desired trajectory data 110. The steering command determination module 102 determines a target steering command such as a torque command and generates torque command data 112 based thereon. The steering command determination module 102 determines the torque command based on a desired steering initiated by the driver (e.g., by steering the steering wheel) and/or a desired trajectory indicated by the autonomous driving system. As can be appreciated, various methods can be used to determine the torque command as the present disclosure is not limited to any one example.

The deboost determination module 104 receives as input measured lateral acceleration data 114, target lateral acceleration data 116, vehicle velocity data 118, and the torque command data 112. Based on the inputs, the deboost determination module 104 learns a deboost factor to be applied to the determined torque command and generates deboost factor data 120 based thereon. The deboost factor, when applied to the torque command, linearizes the lateral acceleration response of the steering system 24 as a result of the torque command at different vehicle velocities.

In various embodiments, the deboost determination module 104 computes the deboost factor $K_{bi+1}$ based on an inverse relationship of a learned boost factor of the steering system 24. The relationship is learned in real-time for the vehicle velocity from an initial boost model $P_{bi}$ using an adaptive filter and the relationships:

$$P_{bi+1} = P_{bi} + \frac{g_{p,i}}{\tau_c * K_{bi}} (a_{y,m} - P_{bi} * \tau_c * K_{bi}), \tag{1}$$

$$K_{bi+1} = K_{bi} + \frac{g_{k,i}}{P_{bi}} \left( \frac{a_{y,t}}{\tau_c} - \frac{a_{y,m}}{\tau_c} \right), \tag{2}$$

where $P_{bi}$ represents an initial boost factor, $\tau_c$ represents the commanded torque, $a_{y,m}$ represents the measured lateral acceleration, $g_{p,i}$ and $g_{k,i}$ represent the gain factors, and $K_{bi}$ represents an initial deboost factor. In various embodiments, the adaptive filter can include, but is not limited to, a recursive least squares filter.

The adjusted steering command determination module 106 receives as input the deboost factor data 120 and the torque command data 112. The adjusted steering command determination module 106 computes a learned commanded torque $\tau_{VLER}$ based on the deboost factor $K_b$ for the vehicle velocity and the torque command $\tau_c$ as:

$$\tau_{VLER} = K_b \tau_c. \tag{3}$$

The learned commanded torque is then provided as learned commanded torque data 122 to the steering system 24 for use in controlling the torque provided by the motor of the steering system 24.

Figure 3:
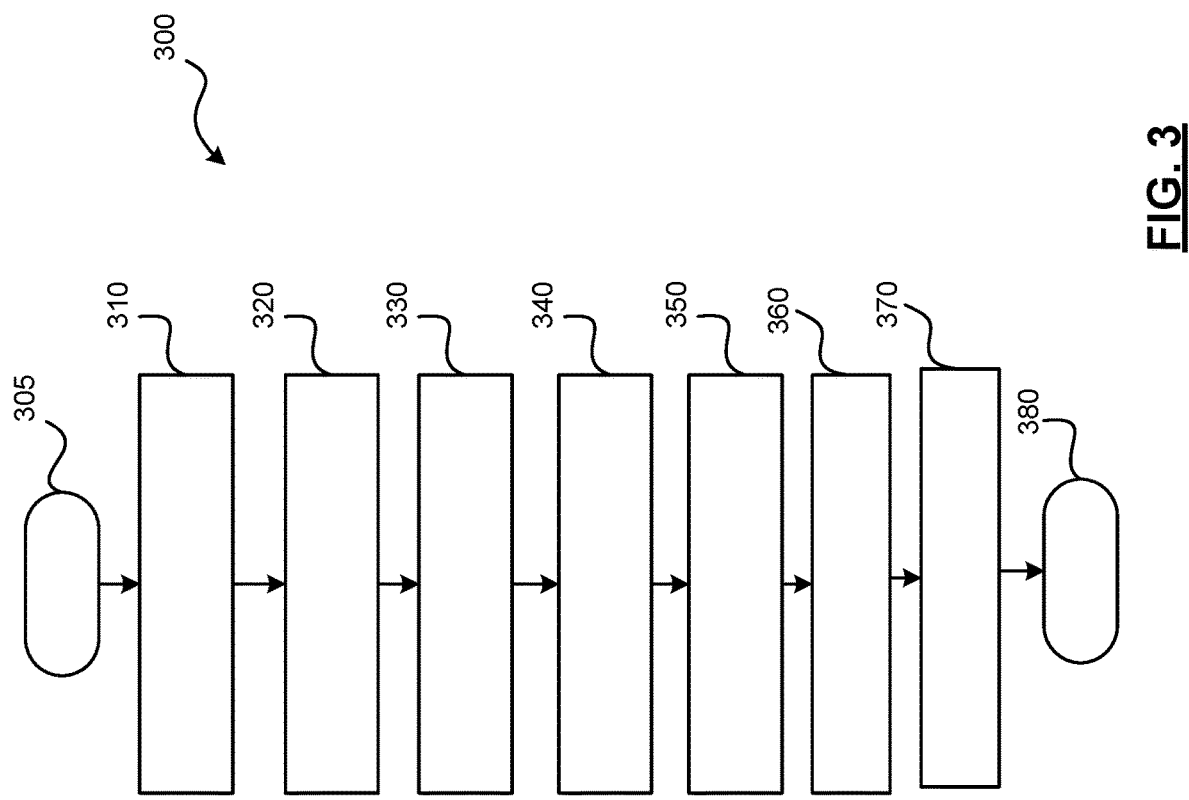
FIG. 3 is a flowchart illustrating a lateral vehicle control method for controlling the vehicle, in accordance with various embodiments.

Referring now to FIG. 3 and with continued reference to FIGS. 1-2, a flowchart illustrates a process 300 that can be performed by the lateral vehicle control system 100 of FIG. 1 in accordance with the present disclosure. As can be appreciated in light of the disclosure, the order of operation within the process 300 is not limited to the sequential execution as illustrated in FIG. 3, but may be performed in one or more varying orders as applicable and in accordance with the present disclosure. In various embodiments, the process 300 can be scheduled to run based on one or more predetermined events, and/or can run continuously during operation of the autonomous vehicle 10, and/or may be run offline prior to operation of the vehicle 10.

In one embodiment, the process 300 may begin at 305. The data used to learn the deboost factor is received at 310-330. For example, the measured and target lateral acceleration data is received at 310. The vehicle velocity data is received at 320. The target steering command is received at 330.

Thereafter, the initial deboost value and the initial boost values are obtained (e.g., from prestored data) at 340. Thereafter, the deboost factor is determined at 350 using, for example, the model relationships (1) and (2) provided above. The deboost factor is then applied to the target steering command at 360 using, for example, the relationship (3) provided above to obtain the adjusted steering command. The adjusted steering command is then generated to the steering system at 370 such that later acceleration is controlled in a linear manner for the various vehicle velocities. Thereafter, the method may end at 380.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle comprising an Electric Power Steering System (EPS), the method comprising:
   learning, by a processor, a non-linearity of a boost factor associated with the EPS;
   determining, by the processor, a deboost factor based on an inverse relationship of the learned non-linearity of the boost factor associated with the EPS; and
   generating, by the processor, a steering command to the EPS based on the deboost factor wherein the learning comprises learning the non-linearity based on a measured lateral acceleration of the vehicle and a target lateral acceleration of the vehicle and wherein the determining the deboost factor is based on an adaptive filter.

2. The method of claim 1, wherein the measured lateral acceleration is determined by a vehicle dynamic sensor.

3. The method of claim 2, wherein the learning comprises learning the non-linearity based on a vehicle velocity.

4. The method of claim 2, wherein the learning comprises learning the non-linearity based on:

$$P_{bi+1} = P_{bi} + \frac{g_{p,i}}{\tau_c * K_{bi}} (a_{y,m} - P_{bi} * \tau_c * K_{bi}),$$

where $P_{bi}$ represents an initial boost factor, $\tau_c$ represents a commanded torque, $a_{y,m}$ represents the measured lateral acceleration, $g_{p,i}$ represents a gain factor, and $K_{bi}$ represents an initial deboost factor.

5. The method of claim 2, wherein the adaptive filter is a recursive least squares filter.

6. The method of claim 5, wherein the determining the deboost factor comprises determining the deboost factor based on:

$$K_{bi+1} = K_{bi} + \frac{g_{k,i}}{P_{bi}} \left( \frac{a_{y,t}}{\tau_c} - \frac{a_{y,m}}{\tau_c} \right),$$

where $P_{bi}$ represents an initial boost factor, $\tau_c$ represents a commanded torque, $a_{y,m}$ represents the measured lateral acceleration, $g_{k,i}$ represents a gain factor, and $K_{bi}$ represents an initial deboost factor.

7. The method of claim 1, wherein the steering command is an adjusted torque command.

8. The method of claim 7, wherein the steering command is the adjusted torque command for a vehicle velocity.

9. The method of claim 1, further comprising storing the learned non-linearities as a model in a data storage device based on a vehicle velocity.

10. A vehicle control system, comprising:
    a non-transitory computer readable medium comprising program instructions; and
    at least one processor in operable communication with the non-transitory computer readable medium, the at least one processor configured to execute the program instructions, wherein the program instructions are configured to cause the at least one processor to:
    learn a non-linearity of a boost factor associated with an EPS;
    determine a deboost factor based on an inverse relationship of the learned non-linearity of the boost factor associated with the EPS; and
    generate a steering command to the EPS based on the deboost factor wherein the program instructions are configured to cause the at least one processor to learn the non-linearity based on a measured lateral acceleration of the vehicle and a target later acceleration of the vehicle and wherein the program instructions are configured to cause the at least one processor to determine the deboost factor based on an adaptive filter.

11. The vehicle control system of claim 10, wherein the measured lateral acceleration is determined by a vehicle dynamic sensor.

12. The vehicle control system of claim 11, wherein the program instructions are further configured to cause the at least one processor to learn the non-linearity based on a vehicle velocity.

13. The vehicle control system of claim 11, wherein the program instructions are configured to cause the at least one processor to learn the non-linearity based on:

$$P_{bi+1} = P_{bi} + \frac{g_{p,i}}{\tau_c * K_{bi}} (a_{y,m} - P_{bi} * \tau_c * K_{bi}),$$

where $P_{bi}$ represents an initial boost factor, $\tau_c$ represents a commanded torque, $a_{y,m}$ represents the measured lateral acceleration, $g_{p,i}$ represents a gain factor, and $K_{bi}$ represents an initial deboost factor.

14. The vehicle control system of claim 11, wherein the adaptive filter is a recursive least squares filter.

15. The vehicle control system of claim 14, wherein the program instructions are configured to cause the at least one processor to determine the deboost factor based on:

$$K_{bi+1} = K_{bi} + \frac{g_{k,i}}{P_{bi}}\left(\frac{a_{y,t}}{\tau_c} - \frac{a_{y,m}}{\tau_c}\right),$$

where $P_{bi}$ represents an initial boost factor, $\tau_c$ represents a commanded torque, $a_{y,m}$ represents the measured lateral acceleration, $g_{k,i}$ represents a gain factor, and $K_{bi}$ represents an initial deboost factor.

16. The vehicle control system of claim 10, wherein the steering command is an adjusted torque command.

17. The vehicle control system of claim 16, wherein the steering command is the adjusted torque command for a vehicle velocity.

18. The vehicle control system of claim 10, wherein the program instructions are configured to store the learned non-linearities as a model in a data storage device based on a vehicle velocity.

19. A vehicle, comprising:
an Electric Power Steering System (EPS);
a sensor system configured to sense observable conditions of the EPS and generate sensor data; and
at least one processor in operable communication with the EPS and the sensor system, the at least one processor configured to execute program instructions, wherein the program instructions are configured to cause the at least one processor to:
learn a non-linearity of a boost factor associated with the EPS based on the sensor data based on a measured lateral acceleration of the vehicle and a target lateral acceleration of the vehicle;
determine a deboost factor based on an inverse relationship of the learned non-linearity of the boost factor associated with the EPS based on an adaptive filter; and
generate a steering command to the EPS based on the deboost factor.

20. The vehicle of claim 19, wherein the program instructions are configured to cause the at least one processor to learn the non-linearity based on:

$$P_{bi+1} = P_{bi} + \frac{g_{p,i}}{\tau_c * K_{bi}}(a_{y,m} - P_{bi} * \tau_c * K_{bi}),$$

where $P_{bi}$ represents an initial boost factor, $\tau_c$ represents a commanded torque, $a_{y,m}$ represents the measured lateral acceleration, $g_{p,i}$ represents a gain factor, and $K_{bi}$ represents an initial deboost factor, and wherein the program instructions are configured to cause the at least one processor to determine the deboost factor based on:

$$K_{bi+1} = K_{bi} + \frac{g_{k,i}}{P_{bi}}\left(\frac{a_{yt}}{\tau_c} - \frac{a_{y,m}}{\tau_c}\right),$$

where $P_{bi}$ represents the initial boost factor, $\tau_c$ represents the commanded torque, $a_{y,m}$ represents the measured lateral acceleration, $g_{k,i}$ represents a gain factor, and $K_{bi}$ represents the initial deboost factor.

* * * * *